US008319624B2

(12) United States Patent
Davis

(10) Patent No.: US 8,319,624 B2
(45) Date of Patent: Nov. 27, 2012

(54) SYSTEM AND METHOD FOR DISCLOSING UNAUTHORIZED REMOVAL OF ARTICLES FROM SECURED PREMISES

(76) Inventor: Charles E. Davis, Coldwater, MI (US)

( * ) Notice: Subject to any disclaimer, the term of this patent is extended or adjusted under 35 U.S.C. 154(b) by 0 days.

(21) Appl. No.: 12/932,477

(22) Filed: Feb. 25, 2011

(65) Prior Publication Data

US 2012/0218108 A1 Aug. 30, 2012

(51) Int. Cl.

| | |
|---|---|
| ***B60Q 11/00*** | (2006.01) |
| ***G06F 19/00*** | (2006.01) |
| ***G08B 19/00*** | (2006.01) |
| ***G08B 13/14*** | (2006.01) |

(52) U.S. Cl. ..................... 340/457; 235/385; 340/572.1; 340/5.2

(58) Field of Classification Search ............... 340/572.1, 340/10.1, 10.2, 572.2, 572.3; 235/385

See application file for complete search history.

(56) References Cited

U.S. PATENT DOCUMENTS

| | | | | |
|---|---|---|---|---|
| 4,728,938 A * | 3/1988 | Kaltner | | 340/572.3 |
| 4,814,985 A * | 3/1989 | Swistak | | 705/18 |
| 5,341,125 A * | 8/1994 | Plonsky et al. | | 340/572.3 |
| 6,275,156 B1 * | 8/2001 | Rasband | | 340/572.1 |
| 6,809,645 B1 * | 10/2004 | Mason | | 340/572.1 |
| 7,132,947 B2 * | 11/2006 | Clifford et al. | | 340/572.3 |
| 7,170,414 B2 * | 1/2007 | Clifford et al. | | 340/572.3 |
| 7,336,183 B2 * | 2/2008 | Reddy et al. | | 340/572.3 |
| 7,495,564 B2 * | 2/2009 | Harold et al. | | 340/572.3 |
| 2008/0156654 A1 * | 7/2008 | Wang et al. | | 205/239 |

* cited by examiner

*Primary Examiner* — Benjamin C Lee
*Assistant Examiner* — Sigmund Tang
(74) *Attorney, Agent, or Firm* — George L. Boller

(57) ABSTRACT

A system and method for securing premises by distinguishing between authorized and unauthorized removal of articles from the premises via an approach within the premises to an exit door (38). Each article is secured by a passive security device (50) which in an article-securing state will be detected upon the article entering the approach and in a non-securing state will not be wirelessly detected upon the article entering the approach. A detector (40), having a detection transmitter and a receiver, wirelessly detects attempted unauthorized removal of a secured article. A register (36) registers authorized removal of a secured article. An unsecuring transmitter (52) is controlled by the register to wirelessly transmit to a passive security device of a secured article whose authorized removal has been registered in the register, an unsecuring signal which unsecures the secured article by changing the passive security device from the article-securing state to the non-securing state.

3 Claims, 2 Drawing Sheets

SYSTEM AND METHOD FOR DISCLOSING UNAUTHORIZED REMOVAL OF ARTICLES FROM SECURED PREMISES

FIELD OF THE INVENTION

This invention relates generally to a system and method for disclosing unauthorized removal of secured articles from secured premises, for example premises of retail stores, warehouses, shipping facilities, and the like. The invention also relates to: a method of securing an article with a passive security device which will be wirelessly detected if removal of the article from secured premises is attempted without proper authorization which, when given, unsecures the article by rendering the passive security device wirelessly undetectable; to a method of wirelessly detecting attempted removal of a secured article before the article leaves secured premises without proper authorization having been given; and to a method of wirelessly unsecuring a secured article when proper authorization which renders the passive security device wirelessly undetectable has been given so that removal of the article the secured premises will not be wirelessly detected as unauthorized.

BACKGROUND OF THE INVENTION

Theft of merchandise is a common problem for many businesses. It is typically considered an added cost of "doing business", a cost which ultimately is borne by consumers.

While various theft prevention devices and systems which are in use today may be partially successful in deterring theft of merchandise, theft continues to be a significant cost of "doing business" for many companies and industries.

SUMMARY OF THE INVENTION

Various aspects of the present disclosure include: a) a theft detection security system; b) a detection method for detecting attempted unauthorized removal of secured articles of merchandise from secured premises, such as removal of unpaid-for articles; c) a security method for securing articles which can be potentially removed from secured premises without authorization, such as without paying for them; d) a method of wirelessly detecting attempted unauthorized removal of articles from secured premises, such as attempted removal of unpaid-for articles; e) a method of wirelessly unsecuring secured articles after they have been authorized for removal from secured premises so that they will not be detected as unauthorized for removal; and f) articles of merchandise which have been secured by the presence of inconspicuous passive security devices in any of a variety of ways intended to avoid notice by persons attempting to remove the secured articles from secured premises without proper authorization.

One general aspect of the invention relates to premises which are secured by a security system for distinguishing between authorized and attempted unauthorized removal of an article from the premises and which comprise: a) a detector, comprising a detection transmitter and a receiver, for wirelessly detecting attempted unauthorized removal of an article from the premises; b) an article comprising a passive security device which secures the article within the premises against attempted unauthorized removal from the premises by being in an article-securing state which renders the passive security device wirelessly detectable by the detector when the secured article enters the approach to the exit; c) a register for registering authorized removal of the secured article from the premises; and d) an unsecuring transmitter controlled by the register for wirelessly transmitting to the passive security device upon authorized removal of the secured article having been registered in the register, an unsecuring signal which unsecures the secured article by changing the passive security device from the article-securing state to a non-securing state which renders the passive security device wirelessly undetectable by the detector when the article enters the approach to the exit.

Another general aspect of the invention relates to a method of securing premises by a wireless detector for distinguishing between authorized and attempted unauthorized removal of articles from the premises via an approach within the premises to an exit from the premises, the articles each being secured by a passive security device which in an article-securing state will be wirelessly detected by the wireless detector and in a non-securing state will not be wirelessly detected by the detector, the method comprising: a) detecting attempted unauthorized removal of a secured article through the exit when the detector wirelessly detects a passive security device in the article-securing state on the secured article upon the secured article entering the approach; b) registering authorized removal of a secured article from the premises in a register which controls an unsecuring transmitter; and c) upon the register having registered authorized removal of a secured article, the register causing the unsecuring transmitter to change the passive security device from the article-securing state to the non-securing state.

Another general aspect of the invention relates to a system for securing premises by distinguishing between authorized and attempted unauthorized removal of articles from the premises via an approach within the premises to an exit from the premises, each article being secured by a passive security device which in an article-securing state will be detected upon the article entering the approach to the exit and in a non-securing state will not be wirelessly detected upon the article entering the approach to the exit, the system comprising: a) a detector, comprising a detection transmitter and a receiver, for wirelessly detecting attempted unauthorized removal of a secured article from the premises; b) a register for registering authorized removal of a secured article from the premises; and c) an unsecuring transmitter controlled by the register for wirelessly transmitting to a passive security device of a secured article whose authorized removal has been registered in the register, an unsecuring signal which unsecures the secured article by changing the passive security device from the article-securing state to the non-securing state.

Another general aspect of the invention relates to an article which comprises a passive security device whose size renders it incapable of being seen by a person's naked eye, and which, in an article-securing state, will be wirelessly detected by a detector upon attempted unauthorized removal of the article from secured premises when the article comes within a specified range of a detector, and which will respond to an unsecuring signal transmitted wirelessly from an unsecuring transmitter by changing from the article-securing state to a non-securing state which unsecures the article by rendering the passive security device incapable of being wirelessly detected by the detector.

DETAILED DESCRIPTION

Figure 1:
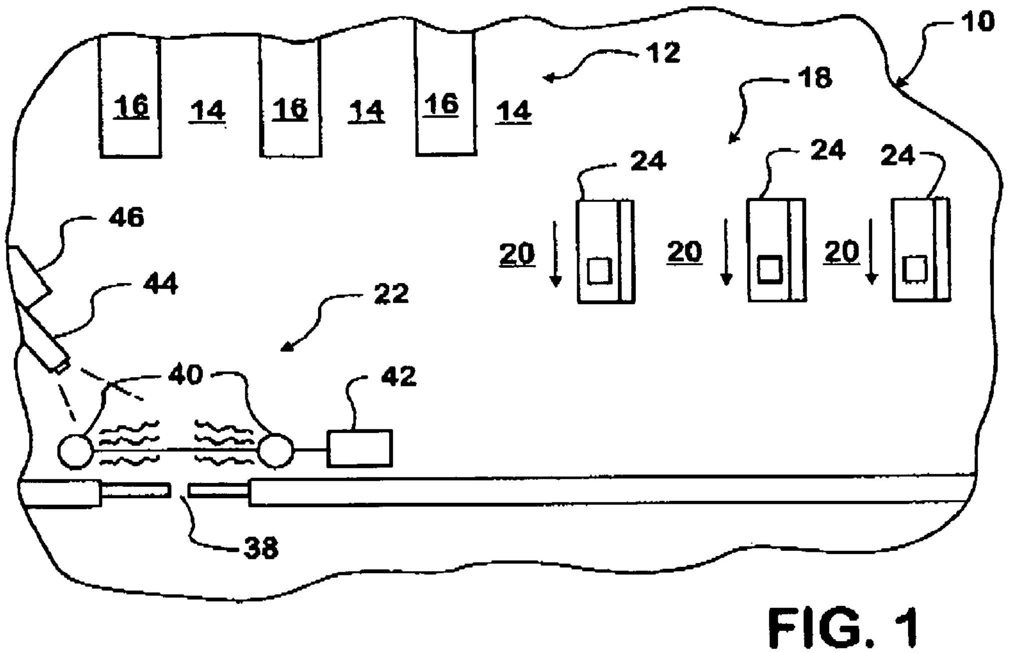
FIG. 1 is a diagram showing a layout of a representative retail facility which has check-out counters and is secured by a security system and method embodying principles of the present invention.

FIG. 1 shows a portion of a building comprising retail premises 10 which comprises a merchandise area 12 containing aisles 14 where various articles of for-sale merchandise are stocked on shelves 16. Articles which customers wish to purchase are carried by the customers to a check-out area 18 where sales are consummated.

Check-out area 18 comprises check-out lanes 20 which may either be self-service or be served by an employee of the retailer. After a sale has been consummated, a customer can transport the purchased merchandise to an exit area 22 of the premises through which the customer can exit the building with his/her purchased merchandise.

Figure 2:
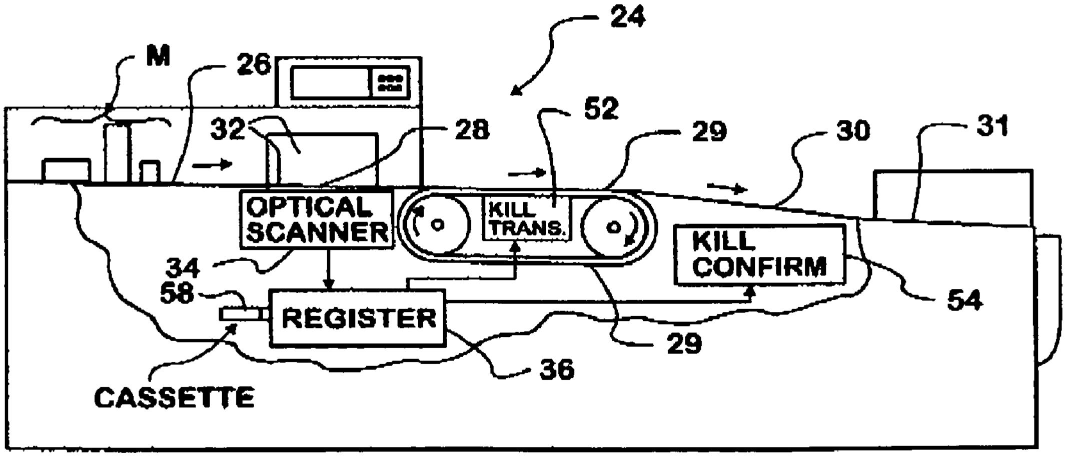
FIG. 2 is an elevation view, partly broken away to show an interior, of a check-out counter.

FIG. 2 shows each check-out lane 20 to comprise a check-out counter 24 on which articles of merchandise to be purchased (designated by the general reference M) are placed. Merchandise to be purchased may first be placed on an approach surface 26 which is ahead of a surface 28 onto or over which the merchandise is moved article-by-article while automated equipment causes the sale of each article to be registered, as will be more fully explained hereinafter. After the sale of an article has been registered, the article passes onto a powered conveyor 29 which conveys the article to an inclined ramp 30 along which it can slide, or roll if the ramp has rollers, onto a collection surface 31 where the customer can retrieve it after having paid for it.

Each article of merchandise contains a UPC bar code which uniquely identifies the specific article. Surface 28 contains one or more areas 32 which allow a scanner 34 to "read" the UPC bar code on an article of merchandise when the article is placed on or moved past an area 32. By making areas 32 optically transparent and using an optical scanner 34 behind the areas, a visible UPC bar code on an article label, tag, or packaging, or on an article itself, can be read by scanner 34 to identify the article. With the article having been electronically identified, the electronic identity is processed by a computer-based register 36 which has access to a data bank comprising a correlation of sale price to bar code for each of various articles of merchandise stocked for sale to determine the article's sale price from the data bank, and the sale price is then recorded in one or more appropriate ways, such as electronically in a suitable storage medium, or memory. The article is then placed on conveyor 29 for transport via ramp 30 to collection surface 31.

After all articles of merchandise have been processed in this manner, register 36 provides a total of the individual sale prices in a dollar or other currency amount which the customer then pays by any appropriate means of payment such as cash, credit, or debit. A sales receipt which lists articles purchased and the sale price of each, and the total amount of the transaction, which may include other charges such as tax, is printed and issued to the customer who can then collect the purchased merchandise from collection surface 31 and leave the building through an exit door 38 of exit area 22.

For securing "for-sale" merchandise against unauthorized removal from premises 10, such as by theft or pilferage, each article of merchandise is secured by the presence of a passive security device which, upon attempted unauthorized removal of the secured article from the premises, will be detected when the secured article comes within a specified range of a detector 40 shown in FIG. 1 at exit area 22 inside exit door 38. Detection of a passive security device by detector 40 immediately initiates some form or forms of security action.

Such forms of action include issuing an alarm via an alarm device or system 42 which may comprise one or more of sounding an audible alarm in the building, illuminating a visible alarm in the building, and transmitting a silent alarm to security or staff personnel on the premises and/or to a remote location. Exit door 38 may also be locked closed.

Exit area 22 is also continuously monitored by a closed circuit television camera 44 and an associated video recording device 46 which records the exit area scene either continuously or at a sufficiently fast snap-shot rate, and which may also have audio recording capability.

Detector 40 comprises a detection transmitter which continuously transmits (i.e. wirelessly broadcasts) a detection signal into an approach to exit door 38 which is inside the building premises. The broadcast range does not extend to merchandise area 12 or to check-out area 18. Detector 40 also comprises a receiver for detecting receipt of a wireless return signal from a passive security device in response to the passive security device having received a detection signal from the transmitter.

Figure 3:
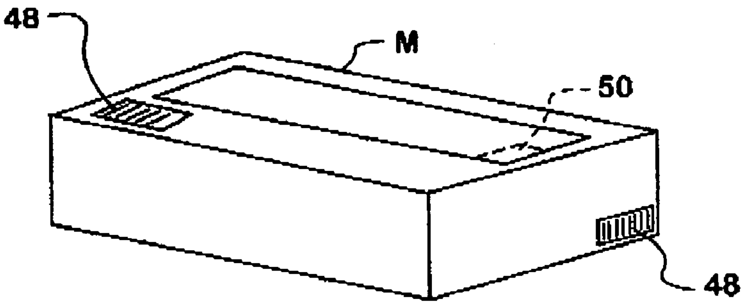
FIG. 3 is a perspective view of an article of merchandise for sale at the retail facility.

FIG. 3 shows an article of merchandise M containing one or more visible UPC bar codes 48 and one or more passive security devices 50. FIG. 3 should not be construed to imply the size, shape, or location of passive security device 50, or the number of such passive security devices on articles, or where such passive security devices are placed on articles, because that is a function of the nature of each article and of the nature of the particular passive security device or devices used. The presence of a passive security device on any particular article of merchandise should be known only to authorized personnel, such as management and security staff of a retailer for example. The size and placement of a passive security device on any particular article of merchandise should render its presence unnoticeable to anyone, other than perhaps in some instances to authorized personnel having knowledge.

A passive security device may take any of various specific forms, to be discussed in more detail later. A passive security device is essentially a miniature, disposable electronic circuit having an antenna, or antennas, which render the device capable of receiving an incident wireless signal or signals and of transmitting a return signal or signals in response to such an incident signal or signals. A passive security device which receives an incident signal of sufficient strength will transmit a return signal of sufficient strength to be detected by the receiver of detector 40. The signal strengths are strong enough to provide detection of unpaid-for merchandise even when the person attempting to remove the merchandise from the premises does so in a concealed manner and/or uses some form of protective shielding.

Attempted removal of an unpaid-for article of merchandise through exit area 22 will result in a signal which is being broadcast by the detection transmitter of detector 40 causing the passive security device which secures the article to transmit a return signal which, upon detection by the receiver of detector 40, causes some form or forms of security action to be initiated.

So that a paid-for article of merchandise will not cause detector 40 to initiate security action when it comes within the broadcast range of the transmitter of detector 40, each check-out counter 24 comprises a "kill" transmitter 52 shown in FIG. 2. Kill transmitter 52, which may also be referred to as an unsecuring transmitter because it unsecures a secured article to allow the article to be removed from the premises without giving an alarm, can transmit a wireless signal, referred to as a kill signal or alternately an unsecuring signal, which is capable of rendering a passive security device incapable of transmitting a return signal in response to an incident signal from the detection transmitter of detector 40. In this way, the state of a passive security device is changed from a first, or "live", state to a second, or "killed", state.

Various ways of rendering a passive security device incapable of responding to an incident signal from the detection transmitter of detector 40 include causing an internal circuit change in the passive security device which changes a response characteristic of the passive security device, such as changing the frequency at which it would respond to a broadcast from the transmitter of detector 40 to a different frequency to which the receiver of detector 40 is not tuned, or overwhelming the internal circuit with enough energy to "burn out" one or more circuit elements needed for transmission of a return signal, thereby simply destroying the passive security device.

Upon register 36 having registered the sale price of an article in an appropriate storage medium or memory, the registration of the sale will cause kill transmitter 52 to transmit an unsecuring signal which "kills" the passive security device securing the article. The kill transmission broadcast is properly targeted to hit the passive security device securing an article whose sale has just been registered, but the broadcast range is not so far as to kill passive security devices on other articles which may be nearby waiting to be scanned. Register 36 keeps a record of each kill by transmitter 52 in an appropriate storage medium or memory. FIG. 2 shows kill transmitter 52 in a location where it transmits a wireless broadcast targeted toward a paid-for article on conveyor 29.

For assurance that the passive security device securing the article whose sale has just been registered has in fact been killed by kill transmitter 52 and is therefore no longer "live", register 36 causes a "kill confirmation" transmitter 54 to confirm each kill after sale of the article has been registered and kill transmitter 52 has transmitted a kill signal intended to kill the passive security device on the article. Kill confirmation transmitter 54 performs a kill confirmation by transmitting a wireless signal which would cause a "live" passive security device to respond by returning a non-confirmation signal to a receiver located either in kill confirmation transmitter 54 or in the immediate vicinity. The kill confirmation broadcast is properly targeted to hit the presumptively-killed passive security device of the article whose sale has just been registered, but the broadcast range is not so far as to cause "live" passive security devices on nearby other articles of merchandise to return signals. FIG. 2 shows kill confirmation transmitter 54 in a location where it transmits a broadcast which is targeted toward a presumptively-killed article on ramp 30. A kill confirmation may be recorded in register 36 in a suitable storage medium or memory in correlation with the registered paid-for sale price of an article of merchandise.

Some of the various forms of passive security device 50 comprise passive nano-, micro-, or pulse-technology circuits. Such extremely small devices, whose sizes render them incapable of being seen by a person's naked eye, lend themselves to placement in merchandise in a variety of ways. Placement should be in a place where the circuit would be unlikely to be removed before an article leaves the secured premises. Articles of wearing apparel can be secured by passive security devices placed in apparel parts which if removed or altered would damage the articles. They can be placed in sewn-in labels or tags which would be expected to not be removed prior to leaving secured premises. Manufactured merchandise can use the manufacturing process to embed a passive security device directly in an article during its manufacturing process using processes such as laminating or pressing. FIG. 3 shows a passive security device 50 placed underneath a label L which is adhered to packaging of the article.

Nano-technology allows nano-type passive security devices to be dispersed in printing ink or fabric dye which is applied to an article of merchandise, a label on an article, or packaging containing an article. Placement of nano-type passive security devices in printing ink which is used to print UPC bar codes on articles allows bar codes themselves to function as the passive security devices, thereby avoiding a separate securing process. One or more nano-type devices which are dispersed in printing ink will become embedded in the ink after the bar code has been printed and the ink has dried.

A manufacturer of articles who incorporates passive security devices by placing them directly on the articles or else in packaging of the articles and then ships them to a wholesale or retail customer enables the customer to verify the presence of passive security devices upon receipt of shipment and count them by a detector to determine if the correct quantity of articles has been shipped.

Figure 4:
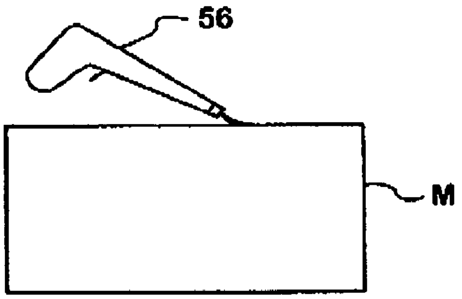
FIG. 4 shows a passive security device securing an article of merchandise.

If a retailer of articles wishes to apply passive security devices, a hand tool applicator, like the one 56 shown in FIG. 4, can apply them at locations on articles of merchandise which the retailer chooses and are known only to the retailer. Such an applicator can dispense ink containing nano-type passive security devices, labels containing passive security devices, or apply passive security devices directly by adhesive mounting or other similar techniques.

FIG. 2 also shows a removable medium, such as a cassette 58, associated with register 36. Cassette 58 has a protocol known to a supplier, or licensor, of the check-out lane apparatus (i.e., scanner 34, register 36, kill transmitter 52, and associated electronic data processing equipment), but not to the user of the apparatus, for limiting the total dollar or other currency sales volume of articles of merchandise whose passive security devices are allowed to be killed by the apparatus. The intent is to provide an accounting control on the extent of use of the apparatus which will assure that a user prepays the supplier, or a licensor of the supplier, for use of the apparatus. Once the sales volume of merchandise processed by the apparatus nears the prepaid limit, an alert can be given to enable the supplier or licensor to replenish the cassette, or exchange the cassette for a fresh one, upon user prepayment for continued use. Instead of a cassette, use can be monitored remotely by the supplier or licensor who can allow continued use after user prepayment. If a user is creditworthy, the supplier or licensor can monitor use and invoice the user accordingly after the fact.

By using this accounting procedure, it becomes unnecessary to involve a supplier of merchandise or a supplier of passive security devices in an accounting procedure. A supplier of merchandise who applies passive security devices to them could however be a secondary or alternate point of accounting.

If the total sales volume were to near the prepaid limit, certain controls in the apparatus become effective to shut down scanner 34, register 36, kill transmitter 52, and kill confirmation transmitter 54, thereby rendering the corresponding check-out lane 20 inoperative until a fresh cassette containing a fresh prepayment currency amount is installed or the existing one is reloaded with a fresh prepayment currency amount. By preventing the registration of the sale of an article in this way, its passive security device remains "live", preventing the secured article from being removed from the premises without triggering an alarm at the exit, or alternatively its removal can be authorized by the purchaser paying for it at another check-out lane which will kill the live passive security device.

Cassette 58 thereby provides a removable medium containing value which is progressively depleted in the amount of the sale price of each secured article as the sale price of each secured article is registered in the register. Upon the amount of depletion of the value approaching some limit, such as the prepaid limit initially loaded into the cassette, the kill transmitter is prevented from transmitting a kill signal. To continue use of the kill transmitter, the cassette is removed from the system, and its value replenished only by a supplier or licensor of the system, such as by returning the cassette to such supplier or licensor. By requiring such removal before a cassette can be replenished with value, and by uniquely identifying each cassette, a supplier or licensor of the system can monitor system usage to assure user compliance with conditions of use specified by the supplier or licensor.

The point at which the remaining value in cassette 58 will prevent kill transmitter 54 from transmitting a kill signal can be set in different ways. One way is by using historical sales data to set a value which is greater than the remaining value in the cassette and which is likely to be exceeded by the total sales price of merchandise purchased by the next customer. Another way is to cause register to perform a "pre-kill" calculation by comparing the sale price of an article which has just been scanned to value remaining in the cassette. If the sale price of an article which has just been scanned exceeds the value remaining in the cassette, the register is prevented from registering the sale and the check-out lane is shut down.

Figure 5:
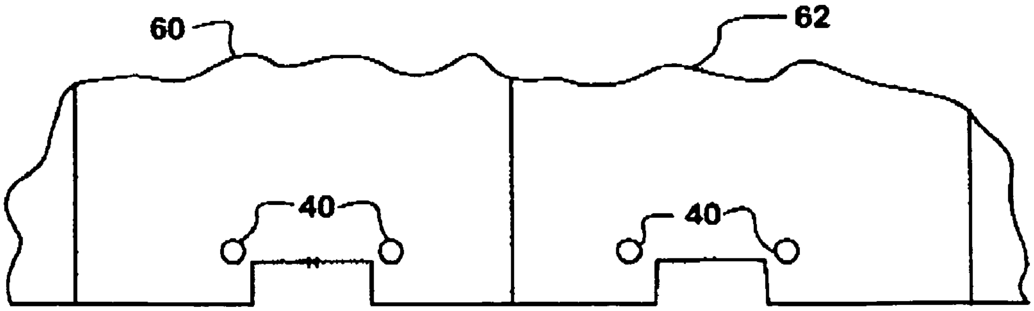
FIG. 5 shows several retail facilities each having its own security system.

The ability to manufacture electronic passive security devices with different frequency response characteristics allows each of different secured premises to be assigned their own unique frequency, much as commercial radios stations are. By reserving frequencies in this way, only passive security devices associated with a particular secured premises are useful at those premises. FIG. 5 shows several retail stores 60, 62, each of which has its own security system like the one shown in FIG. 1, with only the detectors 40 being shown in FIG. 5.

The security system of store 60 operates at a different frequency than the one of store 62. The supplier of the security system, or the licensor of the supplier, can assign a unique frequency to each user which can forestall or prevent unauthorized use of the apparatus and which can also avoid interference with other wireless communication functions, such as inventory control for example. A chain of stores having different geographical locations can be assigned a common frequency for use at all stores.

Attempts to defeat a security system can be made more difficult by using passive security devices which respond to coded wireless detection signals rather than just one particular frequency alone and/or which respond to multiple frequencies. These features may be incorporated into a single passive security device or may be provided by using several different passive security devices to secure a single article of merchandise. A person trying to defeat a system would therefore have to have knowledge not merely of a single frequency, but also knowledge of multiple frequencies and/or codes in order to kill whatever passive security devices are on an article.

A passive security device may also have the capability to respond to a detection signal by a return signal which identifies the specific article in some way such as by its bar code information. This would require a unique passive security device for the specific article of merchandise stocked for sale.

There may be instances where management or staff needs to remove from secured premises one or more secured articles which have not been sold. A separate kill transmitter under the control of management may be used to kill the passive security devices on such articles so that they can be removed without triggering an alarm.

The security system shown in and described with reference to FIG. 1 can provide conclusive proof of attempted theft. Upon detector 40 issuing an alarm indicating that a person is carrying an unpaid-for article of merchandise into exit area 22, the person can be stopped by store and/or security personnel and asked for a cash register receipt to prove the article has been paid for. In the absence of such proof, the article is then first transported out of range of the detection signal from detector 40 and then brought back into range, causing an alarm to once again be issued. These events are recorded on recorder 46 with witnesses present. This proves that the passive security device was live when the person first attempted to remove it from the premises.

With witnesses still present, the article is then brought to an idle check-out counter 24 and processed as if it were being paid for. Register 36 will cause kill transmitter 52 to unsecure the article by killing the passive security device. The article is then brought back to exit area 22 where it will not trigger an alarm. This scene is also recorded with witnesses present and proves a second time that the article was not paid for.

Certain prospective users of the system and method disclosed herein may already have an inventory control system in place using individual R.F.I.D. tags (radio frequency identification tags) applied to each article of merchandise to identify the particular article. An R.F.I.D. tag is a form of passive security device. Those R.F.I.D. tags may also be used as passive security devices in the system and method disclosed herein to provide a combined inventory control and security system.

The combined system registers entry of secured articles of merchandise for sale into inventory within the premises and distinguishes between authorized and attempted unauthorized removal of secured articles from the premises.

The combined system comprises an inventory control subsystem for registering entry of articles for sale into the premises by scanning inventory control R.F.I.D. tags on the articles and causing each article whose R.F.I.D. tag has been scanned to be registered in an inventory data base, and a security sub-system for distinguishing between authorized and attempted unauthorized removal of articles registered in the inventory data base from the premises.

The security sub-system comprises i) a detector for wirelessly detecting attempted unauthorized removal of articles from the premises by detecting R.F.I.D. tags on the articles when their unauthorized removal is attempted, ii) a register for registering an article for authorized removal from the premises by scanning its R.F.I.D. tag and for subtracting the article which has been registered for authorized removal from inventory in the inventory data base; and iii) an unsecuring transmitter controlled by the register for wirelessly transmitting to the R.F.I.D. tag on the article which has been registered for authorized removal, an unsecuring signal which unsecures the secured article by changing the R.F.I.D. tag from an article-securing state which renders the R.F.I.D. tag wirelessly detectable by the detector to a non-securing state which renders the R.F.I.D. tag wirelessly undetectable by the detector.

While a presently preferred embodiment has been illustrated and described, it is to be appreciated that the invention may be practiced in various forms within the scope of the following claims.

What is claimed is:

1. Premises which are secured by a security system for distinguishing between authorized and attempted unauthorized removal of a secured article having a passive security device which secures the article against attempted unauthorized removal from the premises by being in an article-securing state rendering the passive security device wirelessly detectable when the secured article enters an approach to an exit from the premises and which comprise:

a) a detector, comprising a detection transmitter and a receiver, for wirelessly detecting attempted unauthorized removal of a secured article from the premises;

b) a check-out lane comprising a scanner for identifying a secured article by reading a readable identifying code for a secured article and a register for registering authorized removal of the secured article from the premises by registering the secured article's sale price; and c) an unsecuring transmitter controlled by the register for wirelessly transmitting to a passive security device on a secured article upon authorized removal of the secured article having been registered in the register, an unsecuring signal which unsecures the secured article by changing the passive security device from the article-securing state to a non-securing state which renders the passive security device wirelessly undetectable by the detector when the article enters the approach to the exit, and d) a medium associated with the register having a protocol unknown to a user of the check-out lane for setting a limit on the total currency sales volume of secured articles whose passive security devices are allowed to be unsecured by keeping a running total of sale prices of secured articles whose sale prices have been registered in the register, and when the running total comes within some range of the limit, preventing the unsecuring transmitter from transmitting an unsecuring signal.

2. A method of securing premises by a wireless detector for distinguishing between authorized and attempted unauthorized removal of articles from the premises via an approach within the premises to an exit from the premises, the articles each being secured by a passive security device which in an article-securing state will be wirelessly detected by the wireless detector and in a non-securing state will not be wirelessly detected by the detector, the method comprising:

a) detecting attempted unauthorized removal of a secured article through the exit when the detector wirelessly detects a passive security device in the article-securing state on the secured article upon the secured article entering the approach;

b) at a checkout lane, scanning a readable identifying code identifying a secured article, accessing a data base of article sale prices to determine the identified article's sale price, and then registering the identified article's sale price in a register which controls an unsecuring transmitter; and c) upon the register having registered the sale price of the identified article, causing the unsecuring transmitter to change the identified article's passive security device from the article-securing state to the non-securing state; and d) using a medium associated with the register and having a protocol unknown to a user of the check-out lane to set a limit on the total currency sales volume of secured articles whose passive security devices are allowed to be unsecured by keeping a running total of sale prices of secured articles whose sale prices have been registered in the register, and when the running total comes within some range of the limit, preventing, the unsecuring transmitter from transmitting an unsecuring signal.

3. A system for securing premises by distinguishing between authorized and attempted unauthorized removal of articles from the premises via an approach within the premises to an exit from the premises, each article being secured by a passive security device which in an article-securing state will be detected upon the article entering the approach to the exit and in a non-securing state will not be wirelessly detected upon the article entering the approach to the exit, the system comprising:

a) a detector, comprising a detection transmitter and a receiver, for wirelessly detecting attempted unauthorized removal of a secured article from the premises;

b) a check-out lane comprising a scanner for identifying a secured article by reading a readable identifying code for the secured article and a register for registering authorized removal of the secured article from the premises by registering a sale price of the secured article identified by the scanner; and c) an unsecuring transmitter controlled by the register for wirelessly transmitting to a passive security device of a secured article whose authorized removal has been registered in the register, an unsecuring signal which unsecures the secured article by changing the passive security device from the article-securing state to the non-securing state; and d) a medium associated with the register having a protocol unknown to a user of the check-out lane for setting a limit on the total currency sales volume of secured articles whose passive security devices are allowed to be unsecured by keeping a running total of sale prices of secured articles whose sale prices have been registered in the register, and when the running total comes within some range of the limit, preventing the unsecuring transmitter from transmitting an unsecuring signal.

* * * * *